United States Patent [19]

Nelson

[11] 4,384,397
[45] May 24, 1983

[54] TOOL CHANGING MACHINING CENTER WITH SWING SPINDLE

[75] Inventor: James Nelson, Appleton, Wis.

[73] Assignee: Giddings & Lewis, Inc., Fond du Lac, Wis.

[21] Appl. No.: 142,625

[22] Filed: Apr. 22, 1980

[51] Int. Cl.³ .............................................. B23Q 3/157
[52] U.S. Cl. .................................... 29/568; 414/736
[58] Field of Search ............... 29/568, 26 A; 414/736, 414/744 A, 739

[56] References Cited

U.S. PATENT DOCUMENTS

| | | | |
|---|---|---|---|
| 2,901,927 | 9/1959 | Morgan | 77/4 |
| 3,052,011 | 9/1962 | Brainard et al. | 29/26 |
| 3,161,951 | 12/1964 | Anthony | 29/568 |
| 3,217,406 | 11/1965 | Dever | 29/568 |
| 3,259,976 | 7/1966 | Bergstrom et al. | 29/568 |
| 3,516,149 | 6/1970 | Mickas | 29/568 |
| 3,524,248 | 8/1970 | Durr | 29/568 |
| 4,117,586 | 10/1978 | Uchida et al. | 29/568 |
| 4,126,233 | 11/1978 | Jeske | 29/568 X |
| 4,164,809 | 8/1979 | Tsuboi et al. | 29/568 |
| 4,190,947 | 3/1980 | Sato et al. | 29/568 |
| 4,196,506 | 4/1980 | Reed | 29/568 |
| 4,288,909 | 9/1981 | Kielma et al. | 414/736 |

FOREIGN PATENT DOCUMENTS 1095456 12/1967 United Kingdom .
1111497  4/1968 United Kingdom .

Primary Examiner—William R. Briggs
Attorney, Agent, or Firm—Leydig, Voit, Osann, Mayer & Holt, Ltd.

[57] ABSTRACT

An improved tool changing machining center adapted for boring, drilling, milling, tapping and tool changing operations under numerical control. The machining center, which may be built in both vertical and horizontal spindle configurations, has an automatic tool changer including a tool storage matrix, a swing spindle transfer device mounted on the matrix, and a two-handed transfer arm mounted on the headstock. It operates with current commercial tapered shank toolholders and utilizes the existing power drawbolt engagement structure of the toolholders to secure them during tool change.

10 Claims, 19 Drawing Figures

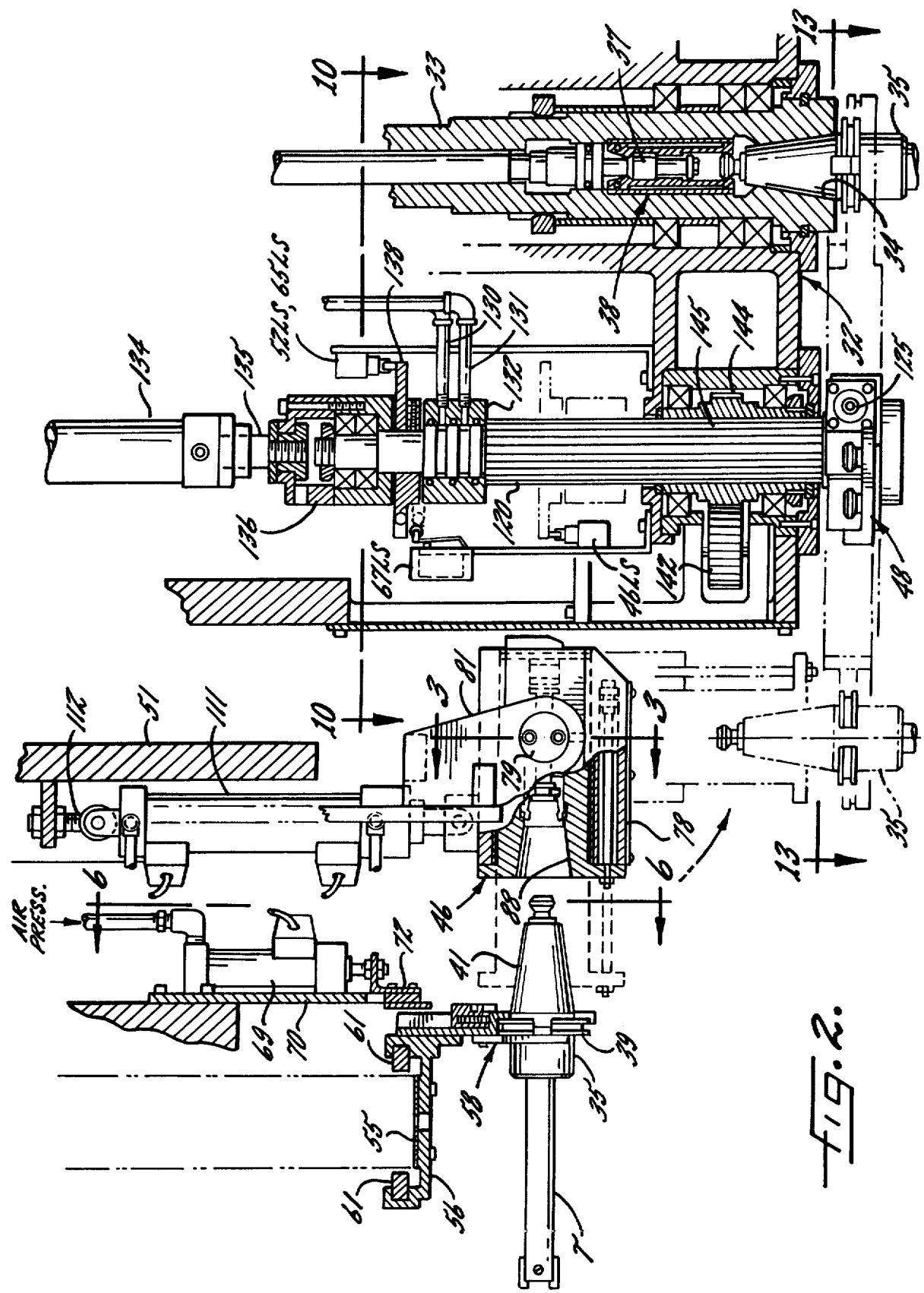

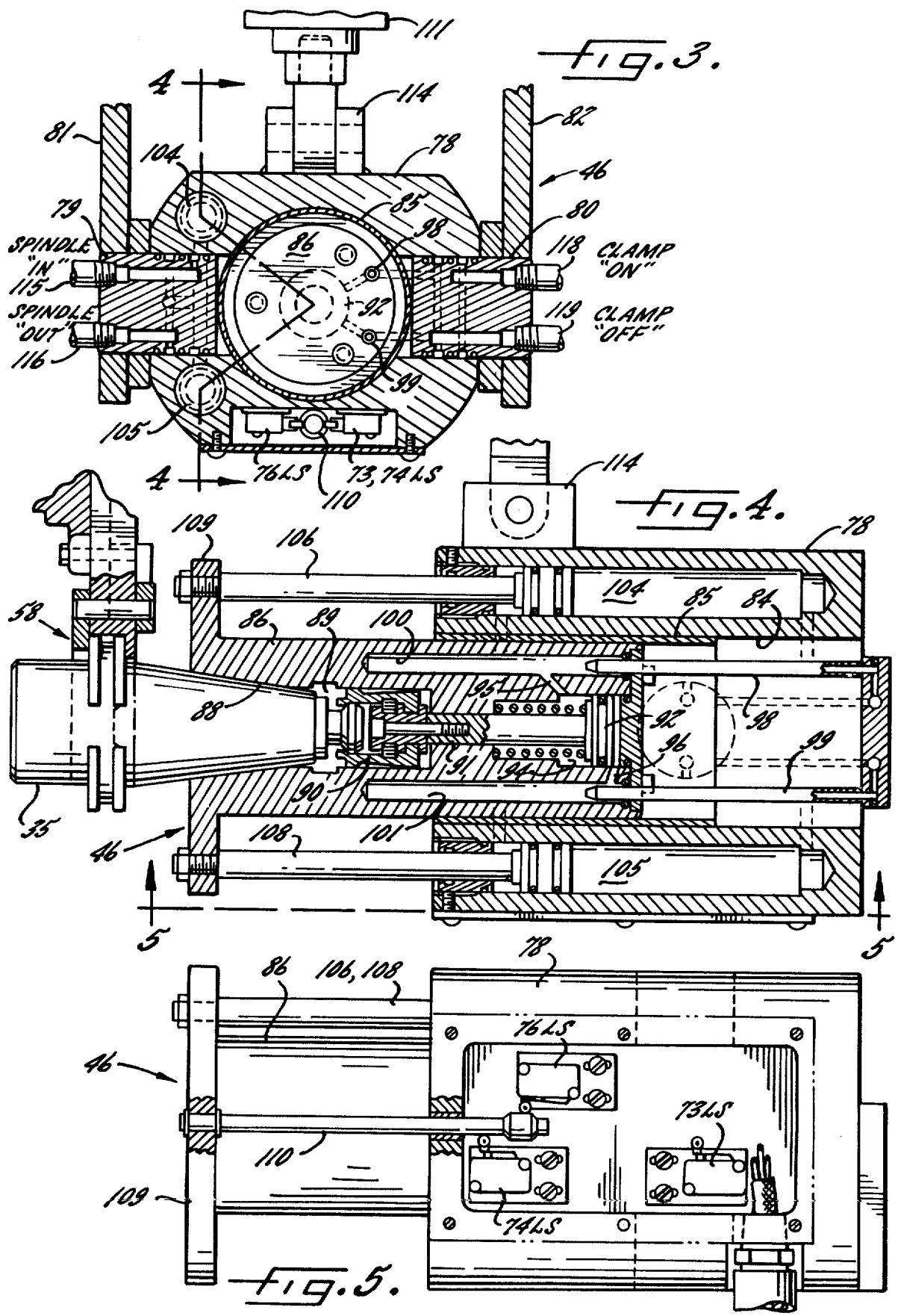

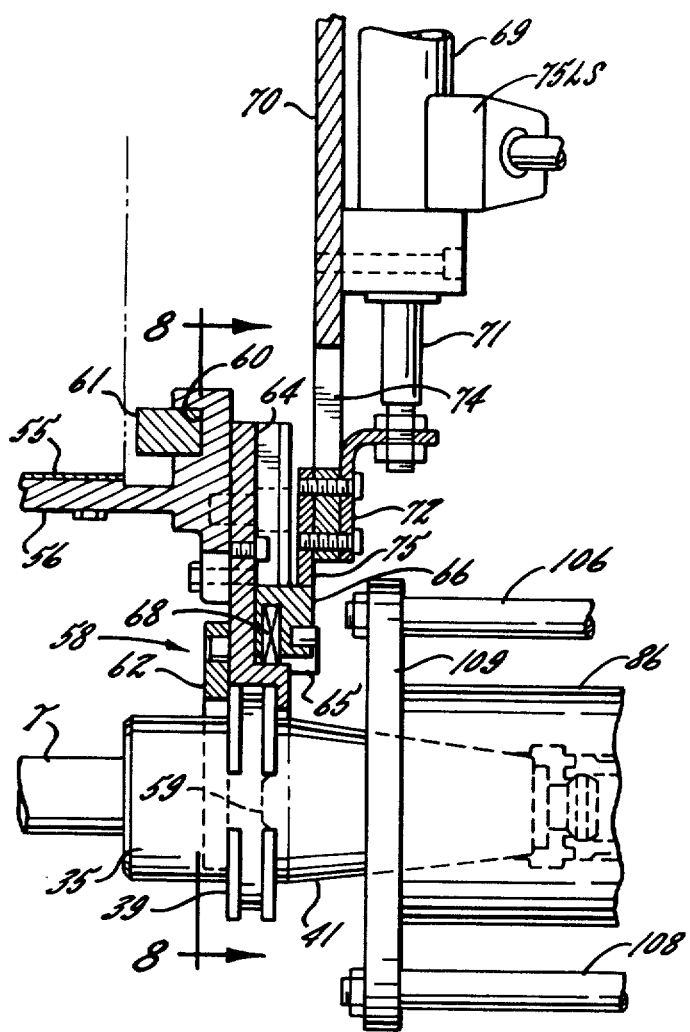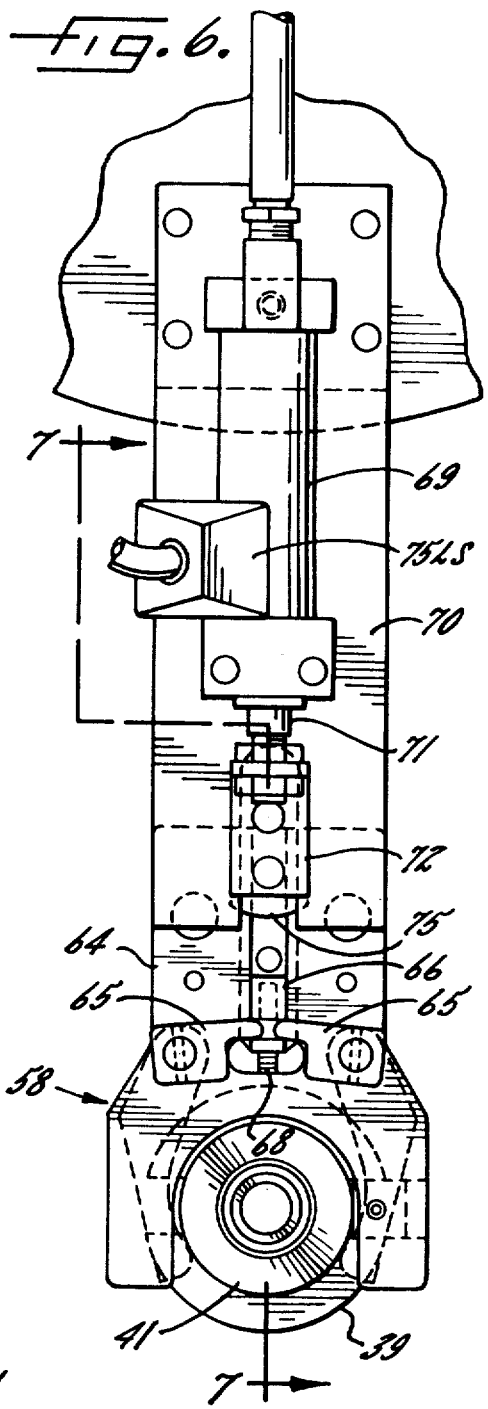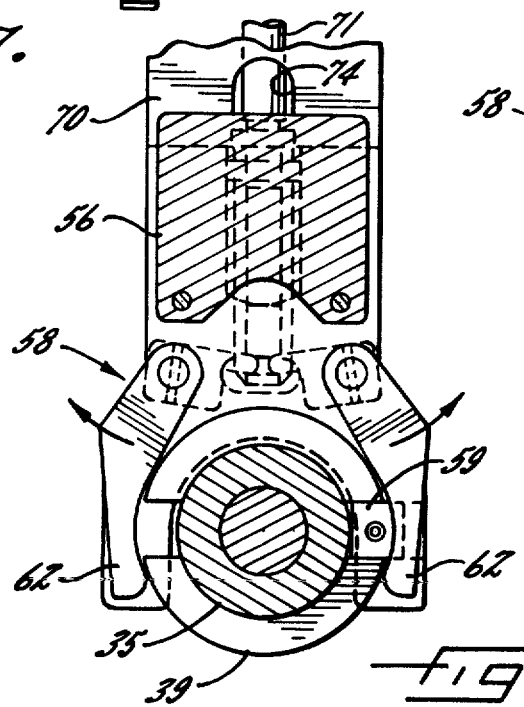

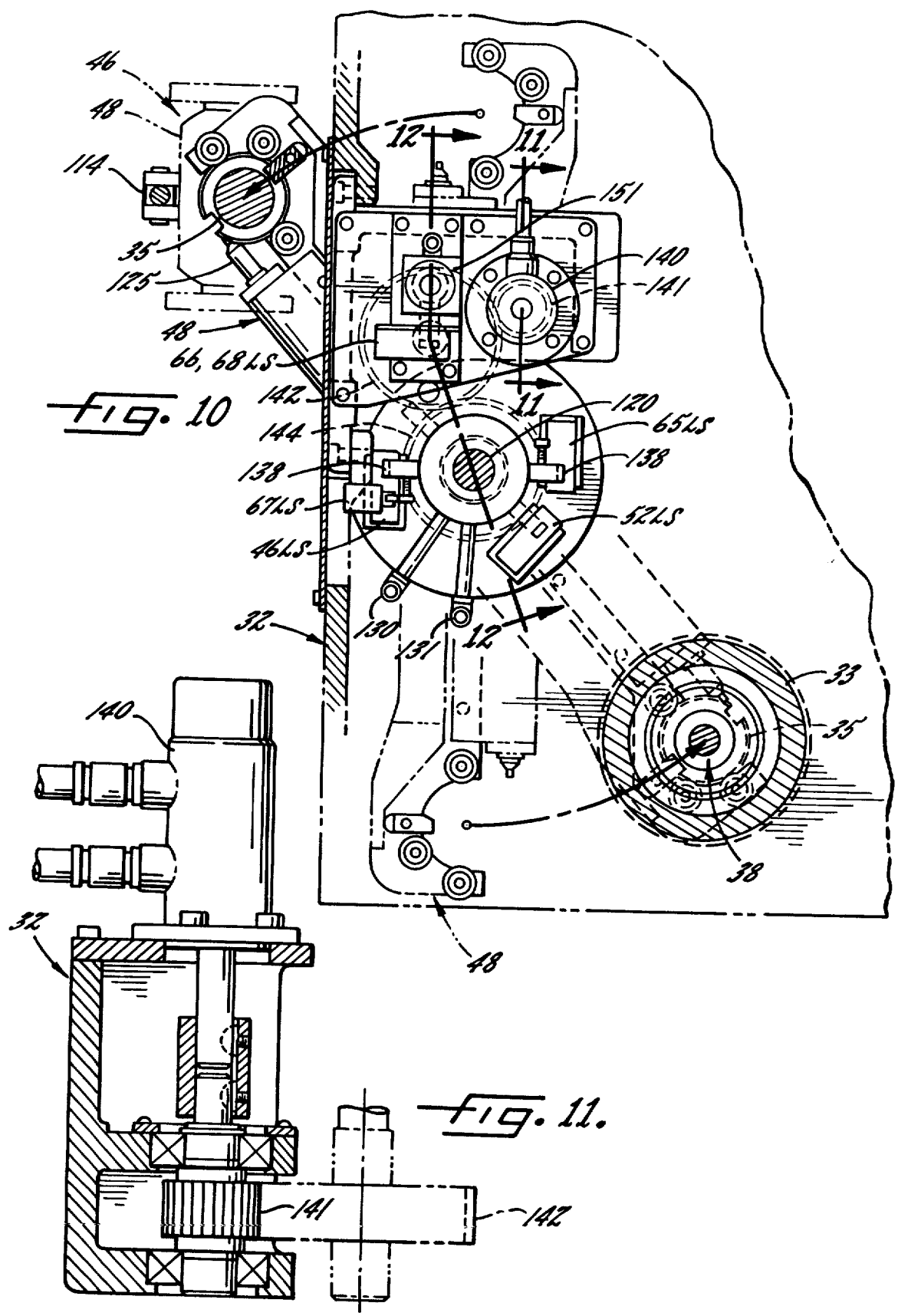

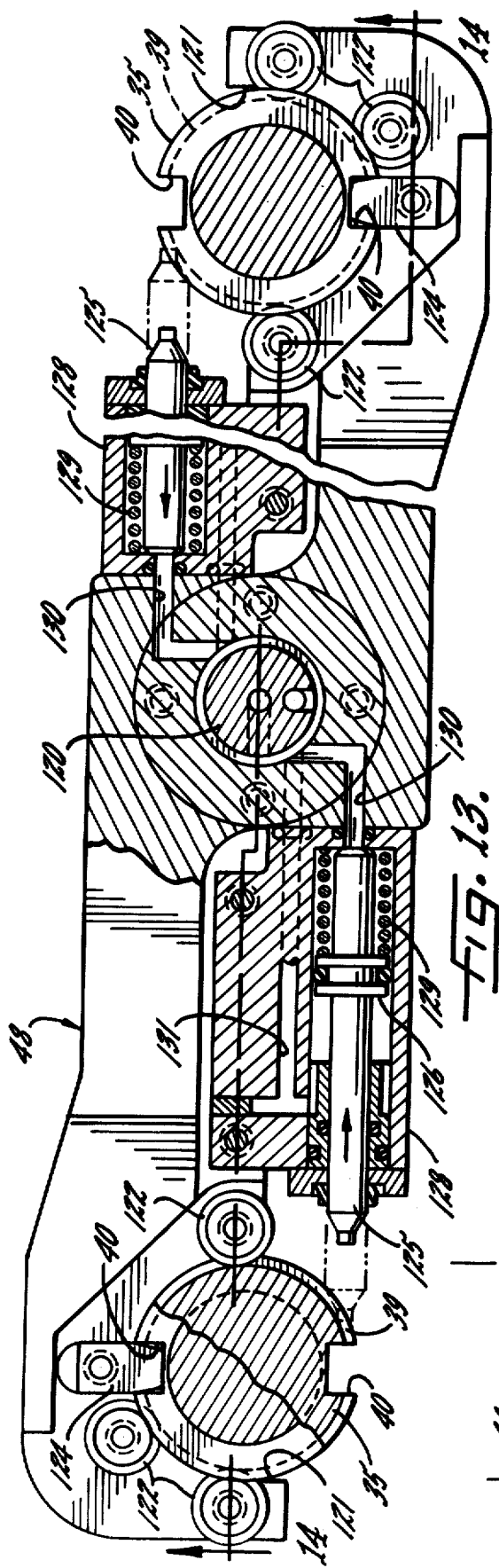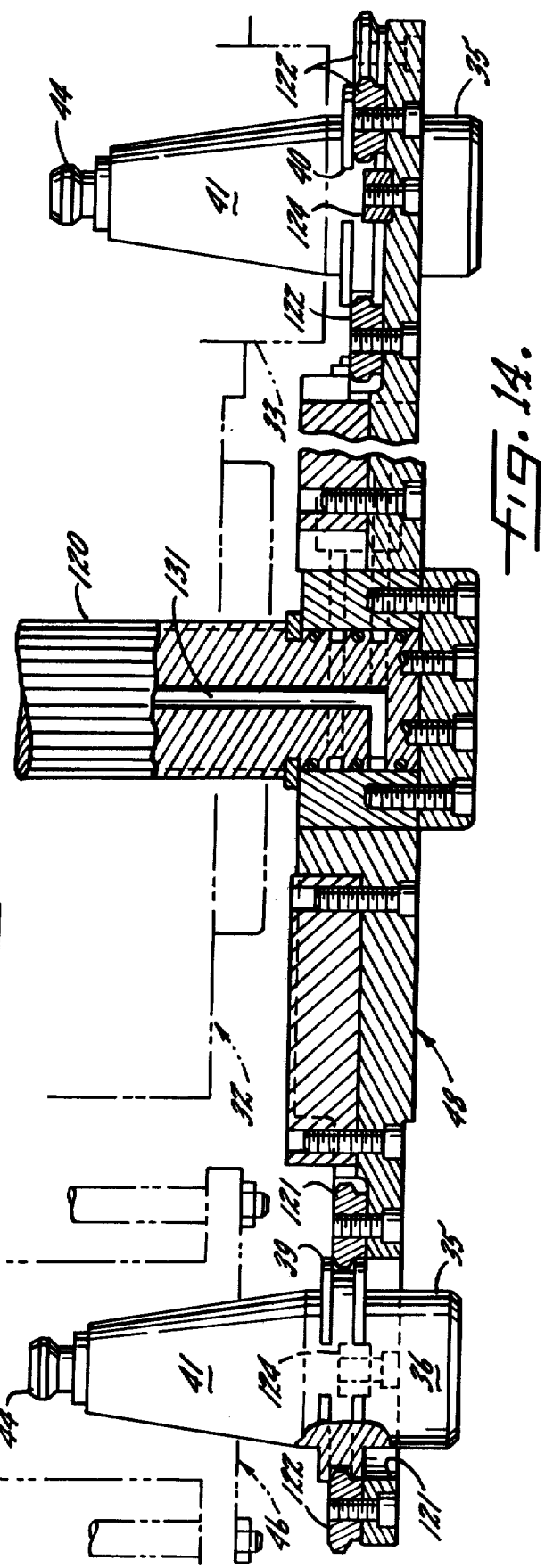

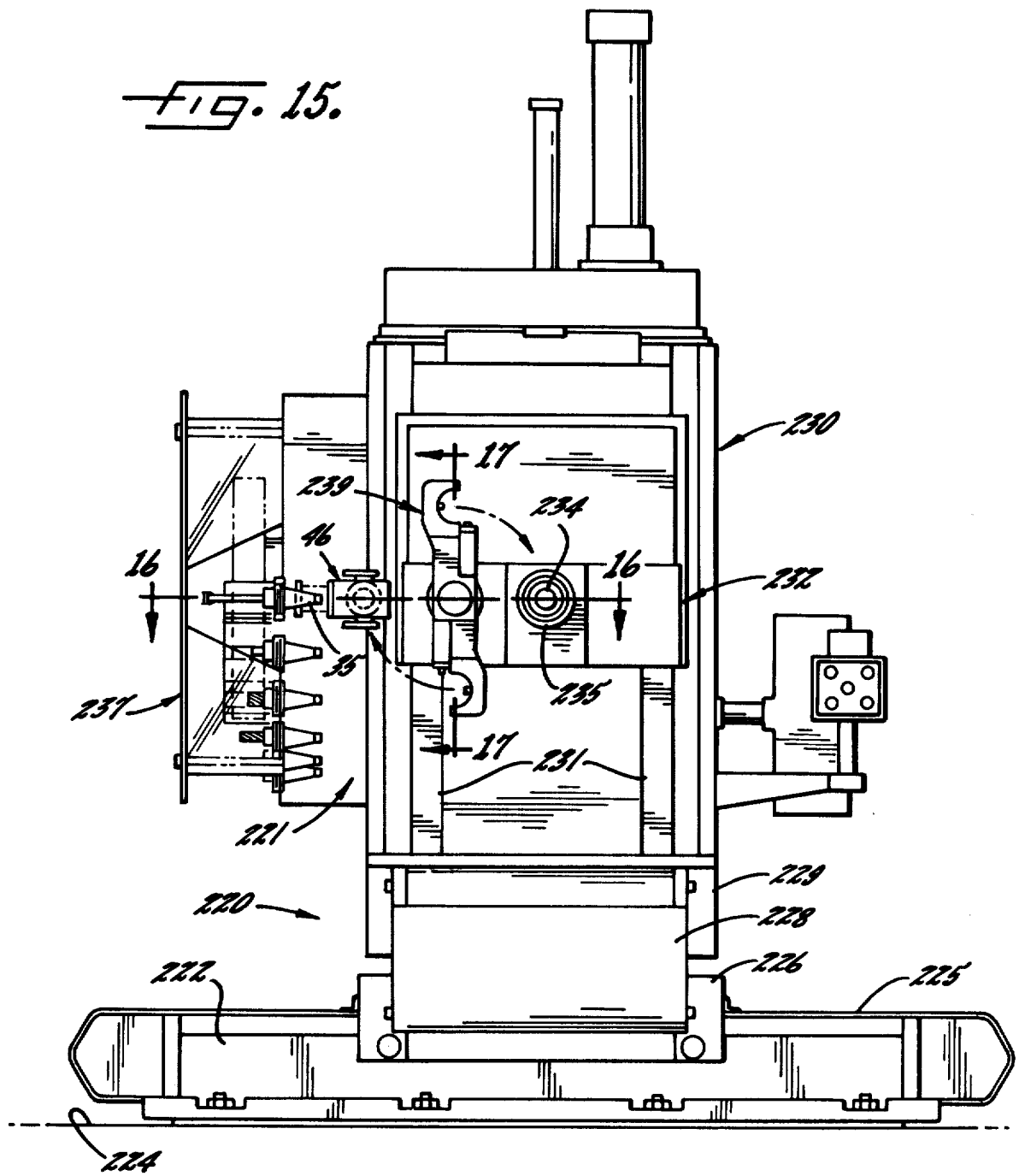

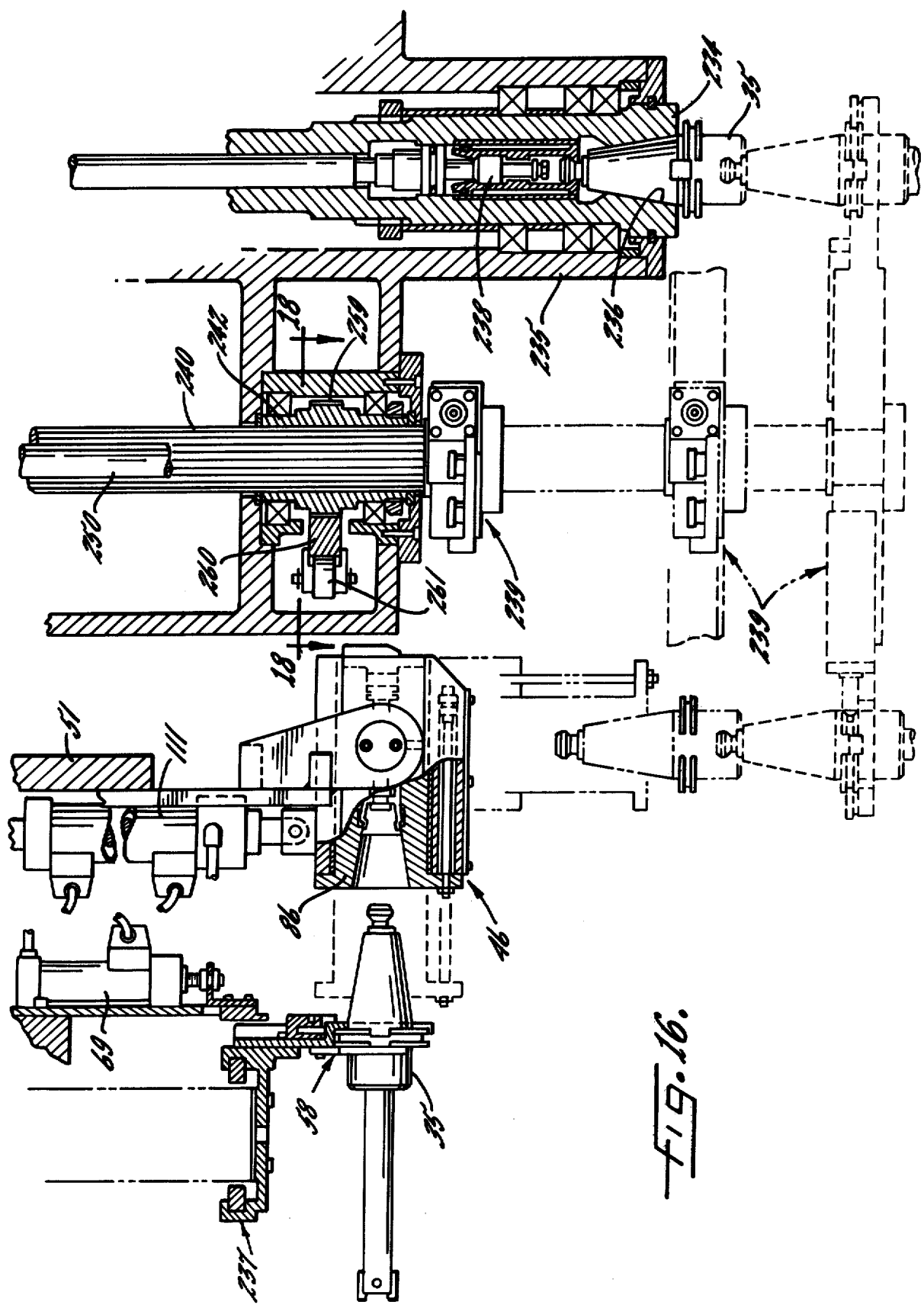

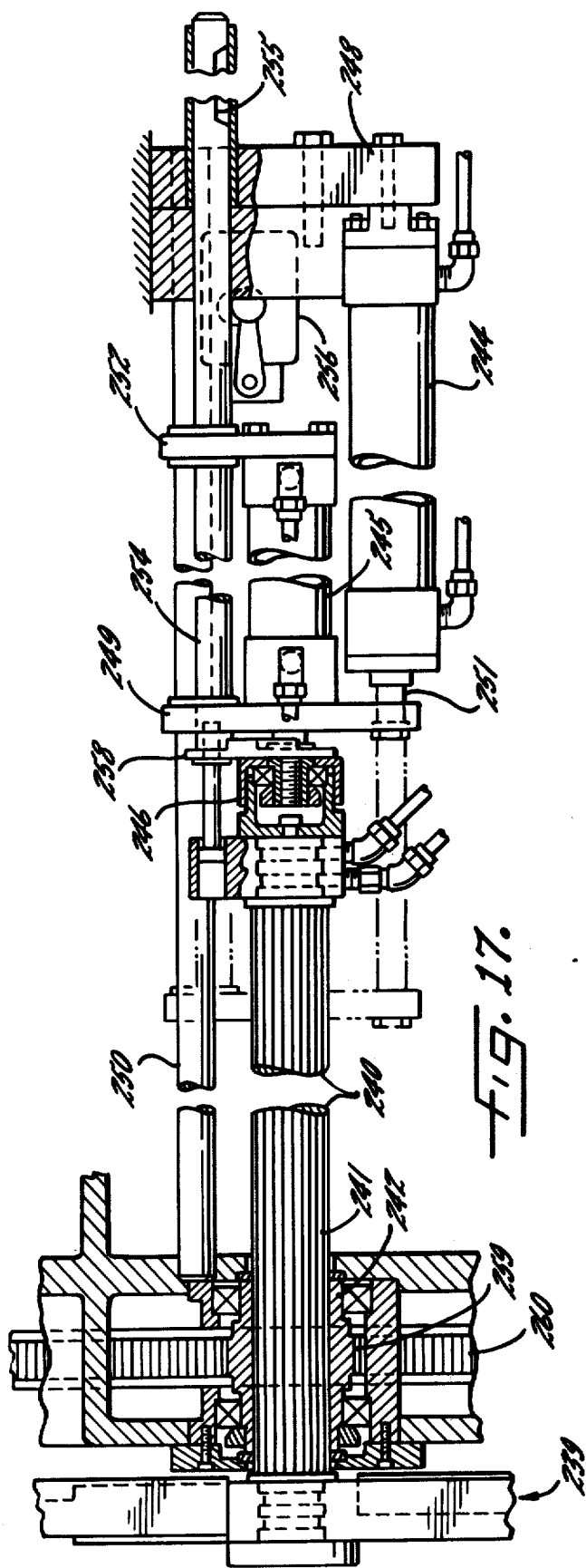
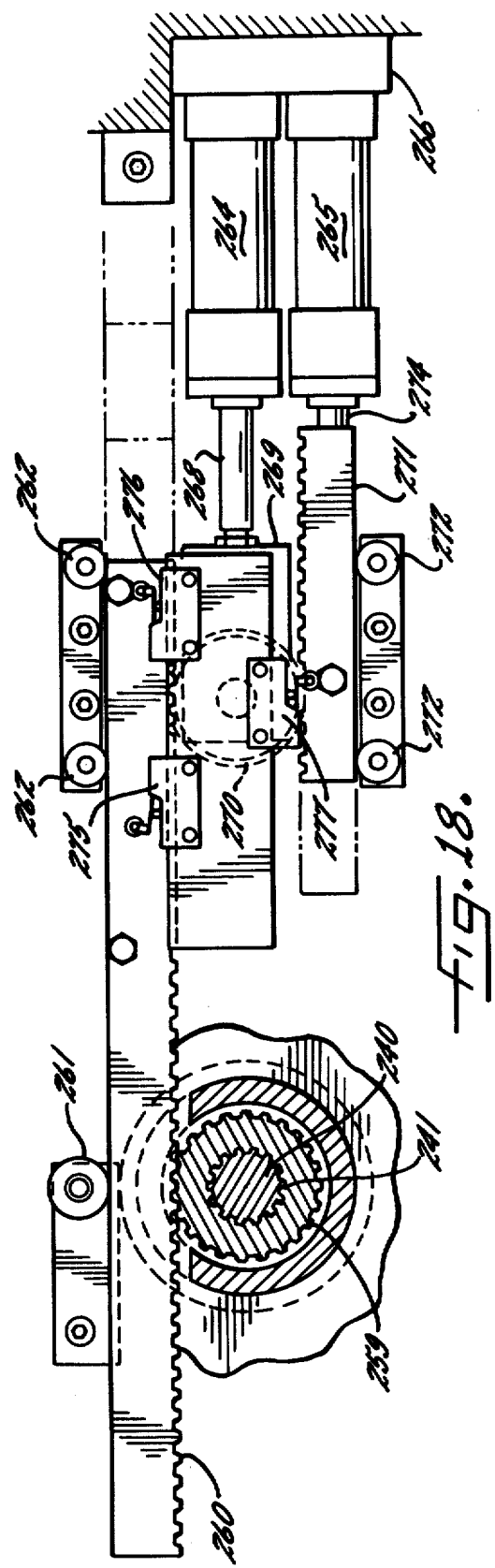

TOOL CHANGING MACHINING CENTER WITH SWING SPINDLE

DESCRIPTION OF THE INVENTION

The present invention relates to machine tools generally and, more specifically, to a multifunction machine tool known as a machining center. Such machines are capable of performing a variety of machining operations such as boring, drilling, milling, and tapping under numerical control. They are usually provided, as in this case, with automatic tool changer capability which also operates under numerical control.

This invention is an improvement over the invention disclosed and claimed in prior U.S. application Ser. No. 856,523 of Robert E. Reed, now U.S. Pat. No. 4,196,506 issued Apr. 8, 1980.

The general aim of the present invention is to provide a machining center adapted to be built in both vertical and horizontal spindle configurations and incorporating an automatic tool changer of improved construction, efficiency, and reliability.

A more specific object of the invention is to provide a machining center of the foregoing type adapted to use tapered shank toolholders of current commercial type and to utilize their existing power drawbolt engaging structure to hold them securely during tool change.

Another object is to provide a machining center and automatic tool changer of the character set forth above having compact and quick-acting power drawbolt mechanisms for releasably securing the tool holder in the swing spindle and in the power driven spindle.

Another object of the invention is to provide a machining center with automatic tool changer of the above type using a swing spindle transfer member between the tool storage matrix and the tool exchange arm.

A further object of the invention is to provide a machining center with automatic tool changer of the foregoing type having tool orienting means on the swing spindle and on the tool exchange arm adapted to engage the orientation notch of a single tool holder simultaneously.

Other objects and advantages of the invention will become apparent from the following detailed description, taken with the accompanying drawings, wherein:

FIG. 2 is an enlarged, broken vertical sectional view through the headstock and tool storage matrix of the machine, taken in the plane of the line 2—2 in FIG. 1.

FIG. 3 is a further enlarged vertical sectional view through the swing spindle support of the machine, taken in the plane of the line 3—3 in FIG. 2.

FIG. 4 is an enlarged broken vertical sectional view through the swing spindle, taken in the plane of the line 4—4 in FIG. 3.

FIG. 5 is an enlarged elevational view of the swing spindle mechanism, taken in the plane of the line 5—5 in FIG. 4.

FIG. 6 is an enlarged elevational view illustrating the matrix clamp and release mechanism, taken in the plane of the line 6—6 in FIG. 2.

FIG. 7 is a fragmentary, broken vertical sectional view through the matrix clamp and release mechanism, taken in the plane of the line 7—7 in FIG. 6.

FIG. 8 is a fragmentary vertical sectional view through a tool holder and its matrix clamp and release mechanism, taken in the plane of the line 8—8 in FIG. 7.

FIG. 10 is a fragmentary horizontal sectional view through a portion of the headstock, taken in the plane of the line 10—10 in FIG. 2.

FIG. 11 is a fragmentary vertical sectional view detailing a portion of the drive for rotating the tool exchange arm, taken in the plane of the line 11—11 in FIG. 10.

FIG. 13 is a fragmentary horizontal sectional view through the tool exchange arm taken in the plane of the line 13—13 in FIG. 2.

FIG. 14 is a broken vertical sectional view taken through the tool exchange arm in the plane of the line 14—14 in FIG. 13.

FIG. 15 is a front elevational view of an illustrative tool changing machining center exemplifying another aspect of the present invention.

FIG. 16 is an enlarged, fragmentary horizontal sectional view taken through the axes of the power driven spindle and the swing spindle in the plane of the line 16—16 of FIG. 15.

FIG. 17 is an enlarged, fragmentary elevational view, partially in section, of the exchange arm and its axial drive, taken in the plane of the line 17—17 in FIG. 15.

FIG. 18 is an enlarged fragmentary elevational view, partially in vertical section, of the tool exchange arm rotational drive, taken in the plane of the line 18—18 in FIG. 16.

Figure 1:
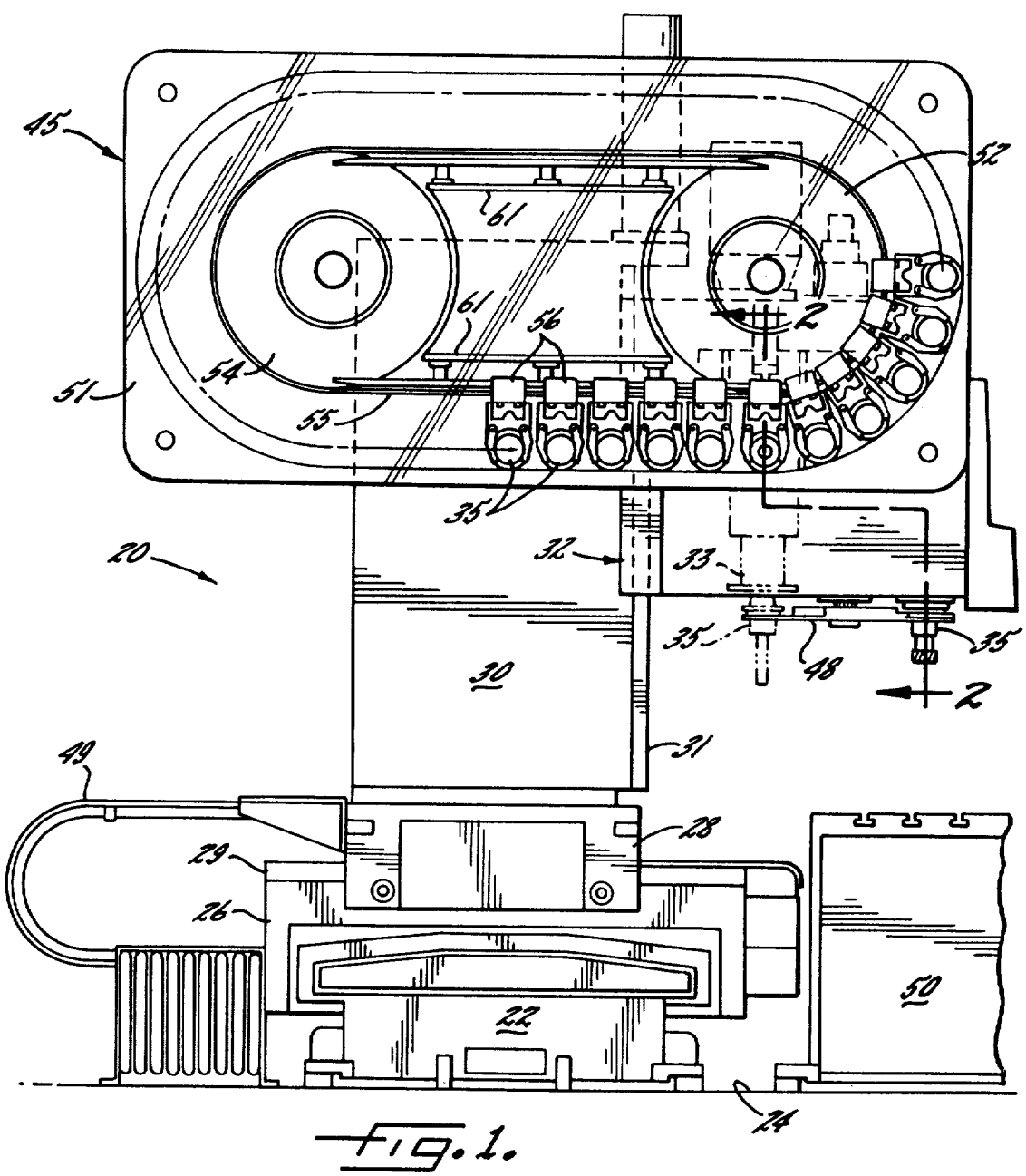
FIG. 1 is a side elevational view of an illustrative tool changing machining center exemplifying one aspect of the present invention.

While the invention is susceptible of various modifications and alternative constructions, certain illustrative embodiments have been shown in the drawings and will be described below in considerable detail. It should be understood, however, that there is no intention to limit the invention to the specific forms described but, on the contrary, the intention is to cover all modifications, alternative constructions, and equivalents falling within the scope of the appended claims.

General Organization—Vertical Spindle Embodiment

Referring more specifically to FIGS. 1 and 2, the invention is there exemplified in an illustrative machining center 20 which incorporates an automatic tool changer 21. The machining center 20 is a vertical power spindle unit and in this instance happens to be a floor type machine. It is adapted to perform boring, drilling, milling and tapping operations, as well as automatic tool changing, all under numerical control.

The machining center 20 utilizes a horizontal base or runway 22 supported on a suitable foundation 24. It includes a saddle 26 supported on antifriction rollers and ways (not shown) on the runway 22 for translational movement longitudinally of the runway, and a cross slide 28 translatably supported by antifriction rollers (not shown) and ways 29 on the saddle for movement along an axis perpendicular to the longitudinal axis of the runway. A column 30 is fixed in upstanding relation on the cross slide 28 and is formed with vertical ways 31 which support a vertically translatable headstock 32.

The headstock 32 has a vertically disposed power driven tool spindle 33 journaled therein on the usual antifriction bearings. The spindle 33 is fashioned with an appropriately tapered socket 34 for receiving and engaging the tapered shanks of the current commercial toolholders used for machining operations.

Figure 1A:
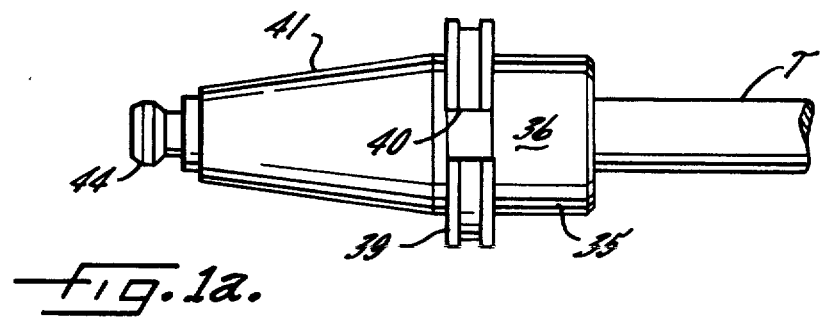
FIG. 1a shows a typical toolholder used in the machining center illustrated in FIG. 1.

A typical toolholder 35 used in the machining center 20 is illustrated in FIG. 1a. The toolholder 35 comprises a body 36 in which a cutting tool T is securely clamped, and a peripheral gripping flange 39 having a pair of diametrically opposed drive keyways 40. It further includes a precision tapered shank 41 adapted to fit into the mating socket 34 in the spindle 33, and a tapered knob 44 adapted to be engaged by the drawfingers of a power drawbolt. In this instance, the spindle 33 happens to have a hydraulically actuated power drawbolt 37 which utilizes a power drawfinger system 38. The latter may, for example, be of the type disclosed in Cayen et al. U.S. application Ser. No. 125,860 filed Feb. 29, 1980 now U.S. Pat. No. 4,303,360.

The automatic tool changer 21 of the machining center 20 comprises a tool storage matrix 45 mounted on the column, a swing spindle 46 mounted on the matrix, and a two-handed tool exchange arm 48 mounted on the headstock. The exchange arm 48 is adapted to move axially in a direction parallel to the rotational axis of the spindle 34 and to rotate in planes perpendicular to the axis of the spindle. Its function is to transfer tools between the swing spindle 46 and the power driven spindle 34.

Service lines for electric power and control, hydraulic power, and air are led to the machining center by means of a flexible tray unit 49 connected to the cross slide 28.

A work table 50 is mounted in front of the machining center 20 and is formed with a number of T-slots for securing a workpiece thereto. The work table may be of the fixed type or of the rotary type. The latter would include an indexable platen adapted to present several sides of the workpiece to the cutting tools so as to minimize set-up time.

Carousel Tool Storage Matrix

The tool storage matrix 45 (FIGS. 1, 2 and 6–9) is of the carousel type and in this instance contains 40 toolholders with their associated cutting tools. It comprises a matrix support bracket 51 which may be a large plate type weldment bolted or otherwise rigidly fixed to the machine column 30. The matrix support bracket 51 has journaled thereon a pair of drums 52, 54 disposed for rotation about horizontal axes in a common vertical plane spaced outwardly from the side of the column. An endless flexible carrier, such as an alloy steel band 55, is trained around the drums for movement in unison therewith. The matrix is driven as by means of a hydraulic motor connected to either one of the drums.

A plurality of tool platens 56 are fixed in longitudinally spaced relation on the flexible band and each carries a suitable tool gripper mechanism 58 adapted to engage the gripping flange 39 of a toolholder. The toolholder is maintained in an angular oriented condition by means of a key 59 fixed to the gripper mechanism. To provide support for the horizontal reaches of the flexible carrier band 55 between the matrix drums, the tool platens 56 are formed with opposed grooves 60 which engage respective pairs of horizontal guide rails 61 fixed to the matrix support bracket between the drums.

Each of the tool gripper mechanims 58 comprises a pair of gripper fingers 62 pivoted to a backing plate 64 at one end and having its opposite end adapted to engage the tool holder flange 39. At its pivoted end, each of the grippers has a small crank arm 65 fixed thereto and which engages a spring loaded plunger 66 slidably mounted on the gripper backing plate 64. The loading on the plunger is in an upward direction away from the toolholder, causing the grippers to press inwardly against the tool holder body 35. Downward movement of the plunger 66 against the action of the biasing spring 68 serves to rock the grippers outwardly so as to release the toolholder.

For the purpose of actuating the tool grippers on a tool platen located at the tool change station during a tool changing cycle, a hydraulic actuator 69 is provided. The latter is fixed in any suitable manner to the matrix support bracket as by means of mounting plate 70 and has a piston rod 71 depending downwardly therefrom. A release latch 72 slidably disposed in slot 74 in the actuator mounting plate is secured to the lower depending end of the actuator piston rod 71. The latch 72 carries a suitable striker plate 75 adapted to engage the spring loaded plunger 66 and press the same downwardly against its biasing spring 68 to release the tool gripper fingers 62. Conversely, withdrawal of the piston rod 71 upwardly permits the plunger 66 to move upwardly due to the thrust of the spring 68, causing the gripper fingers to engage a toolholder.

Swing Spindle Assembly—Vertical

The swing spindle assembly 46 (FIGS. 2–5, 7 and 9) is interposed between the tool storage matrix 45 and the two-handed tool exchange arm 48 on the headstock for the purpose of transferring tools between those components with speed and reliability. The assembly 46 thus comprises a swing spindle housing 78 pivotally mounted on a pair of trunnions 79, 80 fixed to respective ones of support brackets 81, 82. The latter are rigidly connected in any suitable manner to the matrix support bracket 51. The housing 78 is formed with a large central bore 84 which in this instance is provided with an plastic anti-friction liner sleeve 85 extending from the region of the trunnions to the outer end of the bore 84.

A swing spindle 86 is telescopically housed within the housing 78 and its liner sleeve 85. The swing spindle 86 is of hollow cylindrical form with a tapered socket 88 situated in its outer end portion for receiving the tapered shank of a toolholder 35. The inner end of the socket 88 communicates with a counterbore 89 and a bore 90 which houses the drawfinger assembly of a power drawbolt 91. The drawfinger assembly comprises a series of outwardly biased drawfingers adapted to slide over the tapered knob 44 on the tool shank and engage the same by camming action when pulled from the counterbore 89 into the bore 90.

At its opposite end from the drawfinger assembly, the power drawbolt has a hydraulic piston 92 which is adapted to slide within a cylinder 94 (FIG. 4). Hydraulic pressure for clamping and unclamping the power drawbolt 91 is conducted to and from the cylinder via passages 95, 96 and appropriate slip connections defined by fixed conduits 98, 99 and telescoping bores 100, 101. Although the power drawbolt is hydraulically actuated in both the engage and disengage directions, it is also provided with a relatively strong spring 102 adapted to shaft 120 and in this instance happens to be situated between the hydraulic slip coupling 132 and the rotatable coupling 136. The trip flange is thus adapted to actuate limit switches 52LS, 65LS, 67LS, and 46LS (FIGS. 2 and 10). These limit switches are supported on appropriate brackets fixed to the headstock frame.

In order to rotate the arm 48 in planes perpendicular to the axis of the spindle 33, an appropriate motor 140, in this instance hydraulic, is mounted within the headstock (FIG. 11) and connected to the shaft 120 by means of a gear drive. The motor 140 is coupled to a drive pinion 141 which meshes with an intermediate gear 142 of somewhat larger diameter. The gear 142, in turn, drivingly meshes with a driven gear 144 integral with a splined sleeve which engages mating splines 145 formed in the shaft 120. This arrangement permits the shaft 120 to slide axially within the sleeve type gear 144 while maintaining engagement with the drive train from the motor 140.

For the purpose of maintaining precise alinement between the tool holding pockets of the exchange arm 48 with the power driven spindle 33 and swing spindle 86 during two angular working positions of the exchange arm, a precision locating means is provided. One such position of the arm 48 occurs when it first swings from a parked position, shown in dot-dash outline in FIG. 2, into a working position where it engages the old toolholder in the socket of power driven spindle 33 and the new toolholder in the socket of the swing spindle 86, also indicated in FIG. 2. The other angular working position occurs after these tools have been extracted axially from the spindles 33, 86, rotated through 180 degrees, and then moved axially in the reverse direction so as to insert the new tool in the power driven spindle 33 and the old tool in the swing spindle 86.

Figure 12:
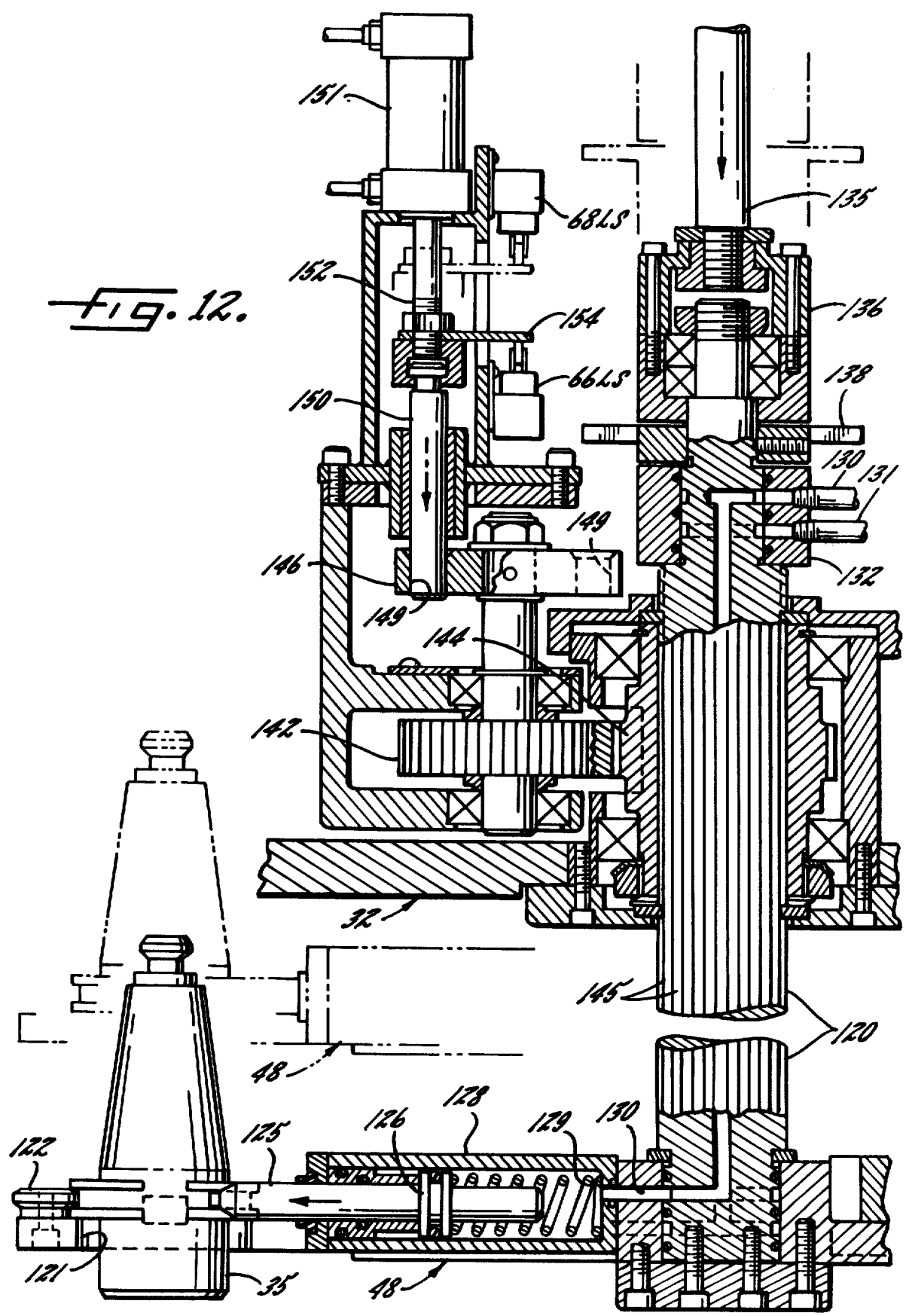
FIG. 12 is a further enlarged, fragmentary sectional view taken through the exchange arm and its supporting shaft and drive mechanism in the plane of the line 12—12 in FIG. 10.

In the present instance, the precision locating means comprises a disc 146 rigidly fixed to intermediate gear 142 via a common shaft 148 (FIG. 12). The disc 146 has two precision locating sockets therein spaced 180 degrees apart. A shot pin 150 is slidably mounted in a bushing adjacent to the disc in position to enter either one of the locating sockets. The gearing is such that the shot pin will register with one socket when the arm 48 is in the first angular position and will register with the other socket when the arm 48 is in the second angular position described above. The shot pin 150 is shifted axially by means of hydraulic actuator 151, the piston rod 152 of which is connected to its upper end. A trip arm 154 extending outwardly from the piston rod is fixed thereto in position to actuate either one of a pair of limit switches 66LS, 68LS mounted on an adjacent bracket. When the shot pin 150 is engaged with either one of the sockets 149, the switch 66LS is tripped. When the shot pin is disengaged from the locating socket, the limit switch 68LS is tripped. The feedback from the switches 66LS, 68Ls is signalled to the machine control.

Synopsis of Operation—Vertical Machine

This synopsis will summarize the operation of the automatic tool changer 21 of the machine 20. As a starting point, it will be assumed that the machine has completed a machining cycle with the old tool in the spindle 33 and the control has called for a tool change. The swing spindle 86 is fully retracted into its housing 78, as shown in solid outline in FIG. 2. The swing spindle power drawbolt is in the unclamped position. The matrix gripping fingers are clamped on the gripping flanges of the toolholders 35. The salient events that then occur are as follows:

(1) The tool storage matrix 45 is then indexed to bring a new tool into the tool change station of the matrix.

(2) The swing spindle 86 is then extended axially over the shank of the ready toolholder by pressurizing the hydraulic actuators 104, 105. After approximately 3.43 inches of axial motion, the swing spindle power drawbolt 91 is accosted by the gripping knob 44 of the ready toolholder. At the same time, the control rod 110 trips the limit switch 76LS, resulting in application of hydraulic pressure to engage the drawbolt 91. This causes the spindle to move foward another 0.47 inches on the tool shank.

(3) The release latch actuator 69 is then pressurized, causing the release latch 72 to move downward and engage the striker plate 75. This depresses the spring loaded plunger 66 and thereby opens the matrix gripper fingers and releases the toolholder 35. Such action by the actuator 69 trips the limit switch 75LS, causing the swing spindle actuators 104, 105 and the swing spindle 86 to extend another 0.375 inches to a position in which it is firmly seated in the swing spindle and the latter is ready to pivot downwardly through 90 degrees.

(4) The headstock 32 shifts from the machining position upwardly to the tool change position indicated in FIGS. 1 and 2. This brings the tool exchange arm 48 into a position enabling it to exchange a tool with the swing spindle 86 when the latter has been swung down through 90 degrees to the position indicated in FIG. 2. The spindle 33 is retracted to its upper limit. The exchange arm 48 is still in park position.

Figure 9:
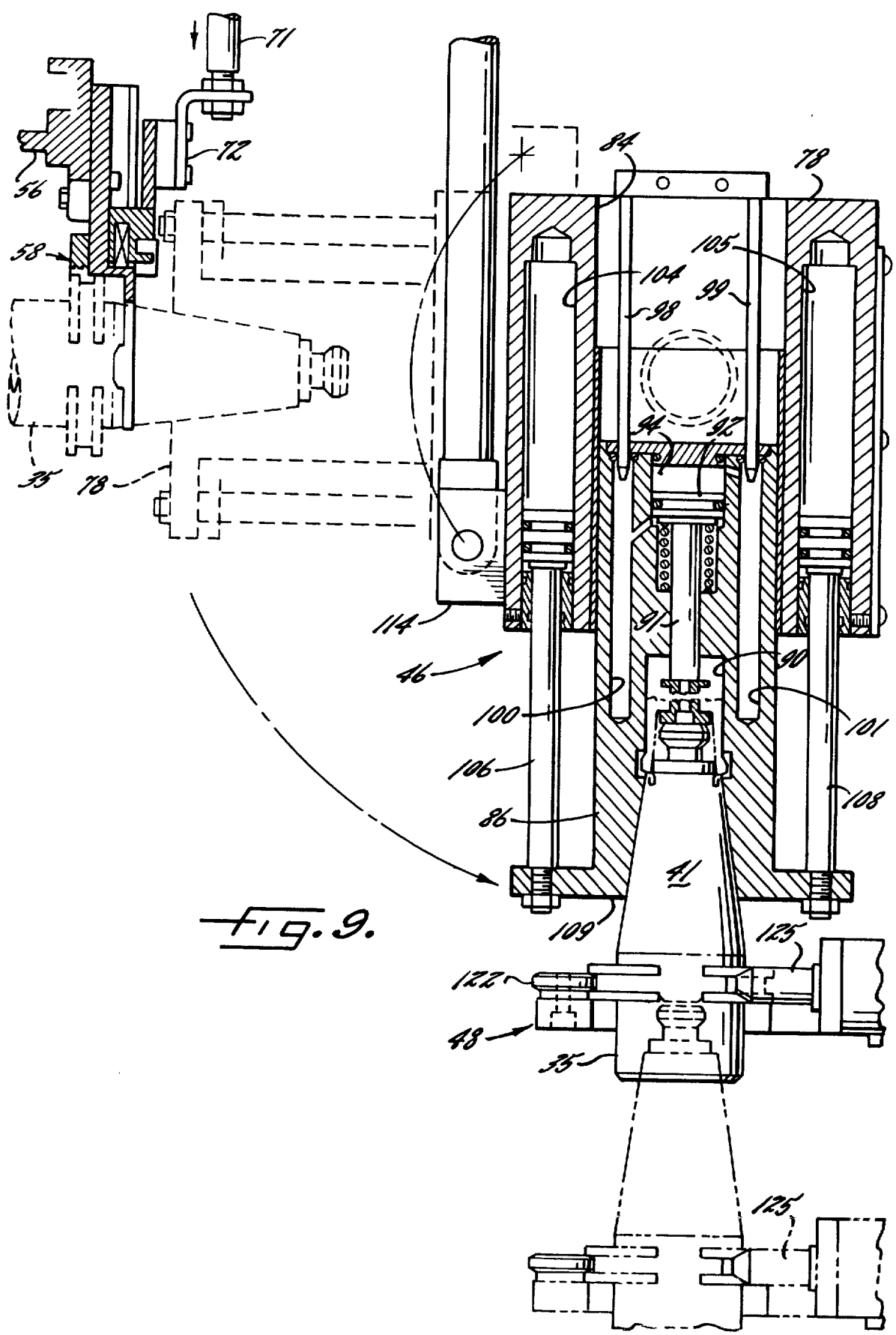
FIG. 9 is a further enlarged fragmentary view taken through the swing spindle and matrix portion of FIG. 2.

(5) The swing spindle pivot actuator 111 is then actuated, causing the swing spindle 86 to pivot downwardly, in a plane parallel to the axis of spindle 33, through 90 degrees to the tool exchange position indicated in phantom outline in FIG. 2 and in solid outline in FIG. 9. This causes the limit switch 72LS to be tripped, confirming that the swing arm is in tool exchange position. The matrix gripper fingers are then closed.

(6) The exchange arm 48 is rotated from home or park position, counterclockwise as viewed in FIG. 10, through an angle of 41 degrees to the first angular working position, as shown in FIG. 10. The shot pin actuator 151 is energized, causing the shot pin 150 to engage a locating socket 149 to hold the arm 48 in precise angular position where it engages the old tool in the power driven spindle 33 and the new tool in the swing spindle 86. The limit switch 65LS is tripped, resulting in application of clamping pressure to the exchange arm latching plungers 125. The matrix 45 then moves to bring the support bracket for the old tool into the ready station.

(7) The power drawbolt 37 of machine spindle 33 is actuated to release the old tool in the spindle. The power drawbolt 91 of the swing spindle is actuated to release the new tool in the swing spindle. Upon release of both power drawbolts, the shot pin 150 becomes disengaged from the locating socket and the tool exchange arm 48 extends axially away from the spindles 33, 86, tripping the limit switch 46LS.

(8) The exchange arm 48 rotates counterclockwise, as viewed in FIG. 10, through an angle of 180 degrees to its second angular working position. The shot pin actuator 151 is energized, engaging the shot pin 150 with the other locating socket. The exchange arm 48 moves maintain the drawbolt in engaged condition in event of a failure of hydraulic pressure.

Provision is made for moving the swing spindle axially in a direction perpendicular to the trunnion pivot axis to facilitate withdrawal of a toolholder 35 from the matrix as well as return of a toolholder to the matrix. In the present instance, this motion may be on the order of 3.805 inches. This is accomplished by means of a pair of hydraulic actuators 104, 105 built into the swing spindle housing 78. The actuators are connected to the swing spindle 86 by their respective piston rods 106, 108 which are fastened to a large flange 109 at the outer end of the swing spindle. The axial movement of the swing spindle relative to the housing 78 is controlled by the hydraulic system associated with the machine. It controls the axial position of the swing spindle through limit switches 73LS, 74LS and 76LS, which are actuated by a control rod 110 also fixed to the flange 109.

The swing spindle 86 is adapted to swing through an arc of 90 degrees from the position indicated in FIG. 4 to the position indicated in FIGS. 2 and 9, or vice-versa, to transport a toolholder between the tool storage matrix 45 and the tool exchange arm 48 (FIG. 2). This is accomplished by means of hydraulic actuator 111 which is pivotally connected at its upper end to a hanger 112 fixed to the matrix support bracket 51, and at its lower end to a clevis 114 fixed to the swing spindle housing 78. The actuator 111 is provided with limit switches 71LS and 72LS situated adjacent its upper and lower ends, respectively, and which are connected to the hydraulic control system of the machine. Prior to swinging through 90 degrees, the swing spindle is first moved axially to engage a toolholder, either in the matrix or in the exchange arm. This initial axial motion may be approximately 3.43 inches so as to telescope over the greater portion of the tool shank until the tapered knob 44 accosts the end of the power drawbolt with the drawfingers disengaged. Engagement of the power drawbolt will then effect snug engagement of the tool shank with the socket 88.

If, for example, the swing spindle is in the position shown in FIG. 4 and has engaged a tool in the matrix in tool change position, the gripper mechanism 58 of the matrix is then opened by the actuator 69 and the release latch 72. The swing spindle is then moved an additional 0.375 inches after which the entire swing spindle 86 and housing 78 may then be swung downwardly through a 90 degree arc to the position shown in FIG. 9. At this point, the tool 35 is presented to the tool exchange arm 48 which swings into engagement with the tool holder in the swing spindle. The control system then releases the power drawbolt of the swing spindle and permits withdrawal of the tool holder by the tool exchange arm to the dot-dash position shown in FIG. 9. The arm also withdraws the old tool from the power driven spindle and inserts it into the swing spindle. Return of the old tool to the matrix is accomplished by reversing the sequence just described.

Hydraulic fluid from the control system of the machine for moving the swing spindle axially is conducted to and from the latter via conduits 115, 116 connected to the trunnion 79 and appropriate internal passages in the swing spindle housing 78 communicating with the actuators 104, 105. By the same token, hydraulic fluid from the control system of the machine for effecting clamping and unclamping of the power drawbolt is conducted to and from the latter by conduits 118, 119 connected to trunnion 80 and internal passages in the housing 78 which communicate with the conduits 98, 99.

Tool Exchange Arm

The tool exchange arm 48, as indicated above, is of the two-handed type and is supported by a shaft 120 which depends from the lower face of the headstock (FIGS. 10, 12-14). The arm 48 is adapted to move in a vertical direction parallel to the axis of the power driven spindle 33 and to rotate in planes perpendicular to the axis of the spindle 33.

For the purpose of receiving tools, or more specifically, toolholders, the outer end portions of the arm 48 are formed with oppositely projecting pockets 121 (FIG. 13). Each pocket is of generally arcuate form and is provided with three locating discs 122 situated at angularly spaced points around its periphery. The discs 122 are of tapered form and adapted to fit snugly within the peripheral groove of the toolholder gripping flange 39. The discs may be adjusted to facilitate precise engagement with the toolholder. A fixed key 124, situated adjacent the midpoint of the arcuate pocket, projects into same so as to register with a corresponding keyway 40 in the gripping flange 39 to maintain angular orientation of the toolholder. The locating discs and key are situated a small amount short of the diameter of the gripping flange 39, thus adapting the pocket to be swung into registration with the toolholder while the same is still gripped in either the power driven spindle 33 or the swing spindle 86.

For the purpose of releasably locking the toolholder in each pocket 121, a latching plunger 125 is mounted in opposing relation to the open side of the pocket. The end of the plunger 125 is suitably tapered to permit snug engagement with the groove of the gripping flange 39. The latching plunger 125 is actuated from the hydraulic control system of the machine. It is formed with a hydraulic piston 126 intermediate its ends and which is adapted to slide within a hydraulic cylinder 128 built into the arm. The plunger 125 may be released by the application of pressure fluid to one side of the piston 126 (the left side as viewed in FIGS. 12 and 14) and by exhausting fluid from the opposite side. Conversely, the latch may be engaged by applying hydraulic fluid to the right side of the piston 126 and by exhausting it from the left side. To make certain the plunger will engage if hydraulic pressure should fail, a strong biasing spring 129 is mounted on the right-hand side of the piston to shift the latching plunger into engaged position.

Hydraulic fluid is conducted to and from the arm 48 by means of conduits 130, 131 which connect with the hydraulic system of the machine (FIGS. 2, 12). The conduits 130, 131 are fixed to a hydraulic slip coupling 132 rotatably mounted on the shaft 120. That portion of the shaft 120 within the coupling 132 is formed with peripheral grooves communicating, respectively, with the conduits 130, 131. The peripheral grooves communicate, respectively, with the opposite ends of the latch actuating cylinders 128 on the exchange arm 48.

For moving the arm 48 axially in a direction parallel to the axis of power driven spindle 33, hydraulic actuator 134 is provided. The lower end of piston rod 135 of the actuator is connected to the upper end portion of the shaft 120 by means of rotatable coupling 136. This arrangement permits the arm to be moved axially independently of its angular position. In order to relate the axial motion of the shaft 120 and arm 48 to the control system of the machine, a trip flange 138 is fixed to the axially toward the headstock, inserting the new tool in the machine spindle 33 and the old tool in the swing spindle 86. The power drawbolts 37 and 91 of the machine spindle 33 and swing spindle 86, respectively, engage the tools. The latching plungers 125 of the exchange arm 48 are unclamped; the shot pin 150 is retracted from the locating socket; and the arm then swings in a clockwise direction to its home or park position illustrated in FIG. 10.

It will be appreciated that the movements described in the foregoing operating sequence have been effected by the control system of the machine 20. The present invention is not concerned with the details of the control system per se, the latter being of a conventional nature.

Horizontal Spindle Embodiment

Turning next to FIGS. 15–18, there is shown an illustrative horizontal spindle machining center 220 also exemplifying the present invention. The machine 220 is a multi-function machining center which incorporates an automatic tool changer 221 similar to the tool changer 21 of the vertical machine 20 described above.

The machining center 220 (FIG. 15) comprises a base 222 supported on an appropriate foundation 224 and having longitudinally extending ways (not shown) on its top side hidden by movable way covers 225. A saddle 226 is slidably supported on the longitudinal ways of the base and, in turn, is provided with ways 228 on its top side extending transversely of the ways on the base. A cross slide or column base 229 is slidably supported on the saddle ways 228. An upstanding column 230 is mounted on the cross slide 228 and is formed with vertical ways 231 which slidably support a vertically translatable headstock 232. The headstock carries a horizontal tool spindle 234 supported in the usual manner on antifriction bearings situated in an outwardly projecting extension 235 of the headstock frame. The machine spindle is formed with a tapered socket 236 for receiving a toolholder 35. It also contains a hydraulically actuated power drawbolt 238 with a drawfinger system adapted to engage the tapered knob 44 on the inner end of the toolholder shank. The drawbolt 238 and drawfinger system are substantially identical to that which has been described earlier herein in connection with the vertical spindle machine 20.

The machine 220 further includes a tool storage matrix 237 mounted in outwardly spaced relation on the column 229 by means of a suitable support bracket. The matrix 237 is generally similar to the tool storage matrix 45 of the machine 20 except for the fact that the tool ready station is located at the front of the machine in a position 90 degrees above the ready station of the vertical machine 20.

The tool changer 221 includes a two-handed tool exchange arm 239 (FIGS. 15, 16, 17) supported by a shaft 240 extending from the front face of the headstock 232 in parallel alinement with the spindle 234. The shaft 240 and arm 239 are axially extensible to a tool pick-up position, and further to a tool exchange position. The shaft 240 and arm 239 are also angularly indexable through 180 degrees for tool pick-up and exchange, and also indexable through 90 degrees to a vertical or park position. The exchange arm 239 has keyed tool receiving pockets 121 and associated power actuated latching plungers 125 similar in construction and operation to those of the tool exchange arm 48 described above. The exchange arm 239 is movable axially in a direction parallel to the axis of the machine spindle 234. The arm 239 is also disposed for rotation in planes perpendicular to the spindle axis.

For the purpose of axially extending and for indexing the exchange arm 239, two relatively compact mechanisms are provided within the headstock housing. Referring more specifically to FIG. 17, it will be noted that the tool exchange shaft 240 is formed with a longitudinally splined section 241 which extends for the greater part of its length. The section 241 engages a correspondingly splined hub 242 journaled on antifriction bearings within the headstock housing. The inner end of the shaft 240 is connected to a pair of hydraulic actuators 244, 245 by means of a rotary coupling 246. Actuator 244 is interposed between a fixed mounting plate 248 and a slidable bracket 249 supported on a guide rod 250, being connected to the bracket 249 by piston rod 251. The bracket 249, in turn, is connected to the rotary coupling 246 by means of the actuator 245, the body of which is secured to the slidable bracket 249 and the piston rod of which is secured to the rotary coupling 246. The rearward end of the actuator 245 is slidably supported on guide rod 250 by a slidable bracket 252. A control rod 254 with a cam surface 255 for operating a limit switch 256 is also connected to the end of the shaft 240 by a bracket 258 extending between the rotary coupling 246 and a shoulder on the control rod 254.

By reason of this construction, the actuator 244 functions to extend the exchange arm shaft and the arm 239 from their parked position to a tool pick-up position for engaging tool holders in the power driven machine spindle 234 and in the associated swing spindle 86. The actuator 245 functions to axially position the exchange arm to extract and replace toolholders in the machine spindle 234 and in the swing spindle 86.

The exchange arm indexing mechanism (FIGS. 17, 18) is adapted to rotate the arm 239 through 90 degrees for parking and through 180 degrees for tool exchange. It comprises a pinion 259 integral with the splined hyb 242 on the exchange arm shaft 240, driven by a meshing rack 260 translatably supported on rollers 261, 262. First and second hydraulic actuators 264, 265 are operated selectively to position the rack 260, and thus index the exchange arm 239. Both of the actuators are fixed at one end to the headstock through an adjustable support 266. The piston rod 268 of the first actuator is secured to a yoke 269 having a floating pinion 270 journaled therein which meshes with the rack 260 and a second rack 271. The latter is translatably supported on rollers 272 and driven by the piston rod 274 of the second actuator 265. The floating pinion 270 is interposed between the racks 260, 271 for driving engagement therewith. A plurality of limit switches 272, 274, 275 mounted on the yoke 269 sense the position of the racks as the arm 239 is indexed.

The piston rods 268, 274 of the actuators 264, 265 have equal strokes and each is operated so as to assume a fully extended or a fully retracted position. The mechanical relationship of the drive between the actuators is such that operation of the actuator 264 will produce 180 degrees of rotation of the arm shaft 240 for tool exchange. Operation of the actuator 265 will produce 90 degrees of rotation for moving the arm 239 into or out of the vertical parked position. When the actuators 264, 265 are positioned as illustrated in FIG. 18, the tool exchange arm is in the vertical parked position.

The automatic tool changer 221 includes swing spindle assembly 46 (FIGS. 15, 16) which is interposed between the tool storage matrix 237 and the two handed tool exchange arm 239 for the purpose of transferring tools therebetween. The assembly 46 of tool changer 221 is substantially identical in structure and operation to the swing spindle assembly 46 of the vertical machine, the principal difference being that the assembly 46 and its swing spindle 86 associated with the horizontal machine 220 are disposed to swing in a horizontal plane instead of a vertical plane. The horizontal plane in this instance is also parallel to the axis of the machine spindle 234 and is identified by the line 16—16 in FIG. 15. As in the case of the vertical machine, the assembly 46 in the horizontal machine is supported from the matrix support bracket.

The operation of the tool changer 221 is closely similar to that of the tool changer 21 described earlier, with very minor differences. The tool change position of the headstock 232, for example, is in horizontal alignment with the swing spindle assemly 46 and the ready station at the front of the matrix, as shown in FIG. 15. In addition, the tool exchange arm 239 has a further increment of axial motion compared to that of the exchange arm 48. As indicated in FIG. 16, this is due to the fact that the headstock housing includes a relatively long spindle extension 235. The arm 239 must travel beyond the end of the extension 235 before it can engage and exchange tools.

I claim as my invention:

1. A multifunction machining center having a power driven spindle rotatable on a spindle axis and an automatic tool changer operatively associated therewith, said machining center comprising, in combination:
   (a) an upstanding column;
   (b) a headstock mounted on said column for vertical sliding movement with respect thereto and including said power driven spindle; said headstock having a tool change position;
   (c) a tool storage matrix mounted on a support on one side of said column in outwardly spaced relation to the latter;
   (d) said matrix having at least one drum journaled for rotation about an axis perpendicular to a vertical plane passing through the spindle axis and being adapted to carry toolholders for bodily movement in a curved path with their axes perpendicular to said vertical plane;
   (e) a swing spindle housing mounted on said matrix support for pivotal movement on an axis between said matrix and said headstock through an angle of 90 degrees in a plane parallel to said spindle axis;
   (f) a swing spindle movably mounted in said swing spindle housing;
   (g) means defining a tapered socket in said swing spindle for telescopically receiving the tapered shank of a toolholder;
   (h) hydraulically actuated power drawbar means in said swing spindle for releasably locking a toolholder in said tapered socket, said power means being operable to pull said toolholder against said socket;
   (i) a two handed tool exchange arm mounted on said headstock for axial movement parallel to the spindle axis and rotational movement in planes perpendicular to said spindle axis;
   (j) said exchange arm being adapted to exchange toolholders between said swing spindle and the power driven spindle of said headstock;
   (k) means for moving said swing spindle axially in a direction perpendicular to the pivot axis of said swing spindle housing to telescopically engage the shank of a toolholder in said matrix and to lock same therein by said power drawbar means; and
   (l) means effective upon engagement of said swing spindle with the shank of the toolholder to rotate said swing spindle through said 90 degree angle to present the toolholder to said exchange arm.

2. The combination set forth in claim 1 wherein each said toolholder has a gripping knob and said power drawbar means of said swing spindle is adapted to engage the gripping knob of the toolholder.

3. The combination set forth in claim 1 wherein said swing spindle is adapted to receive the tapered shank of a toolholder presented by said exchange arm; said rotating means is effective upon engagement of the toolholder from the exchange arm to rotate said swing spindle housing through 90 degrees toward said matrix, and said axial motion means is adapted to move the swing spindle in a direction perpendicular to the pivot axis to return the toolholder to said matrix and to disengage itself therefrom.

4. The combination of claim 1 wherein said power driven spindle is vertically disposed.

5. The combination of claim 1 wherein said power driven spindle is horizontally disposed.

6. In a tool changing machining center having a headstock, the combination comprising:
   (a) a power driven spindle journaled in the headstock for rotational movement on its axis and having a tool receiving socket;
   (b) a tool storage matrix adapted to carry a plurality of tools;
   (c) a tool exchange arm mounted on the headstock for axial and rotational motion relative thereto;
   (d) a swing spindle housing mounted on a support for pivotal movement between and relative to said matrix and said exchange arm in a plane parallel to said spindle axis;
   (e) a swing spindle having a tool receiving socket mounted in said swing spindle housing for movement relative to the latter;
   (f) means for rotating said swing spindle housing with said swing spindle through an arcuate path of 90 degrees to transfer tools directly between said matrix and said exchange arm; and
   (g) said power driven spindle and said swing spindle assembly each having a power drawbar for releasably locking a toolholder therein, the swing spindle power drawbar being operable to pull said toolholder against said socket.

7. The combination set forth in claim 6 wherein said tool storage matrix is supported on a matrix support bracket and said swing spindle assembly is also supported on said matrix support bracket.

8. In an automatic tool changer for a machining center having a headstock and a power driven spindle journaled therein, the combination comprising:
   (a) a tool storage matrix adapted to carry a plurality of tools;
   (b) a matrix support bracket;
   (c) a tool exchange arm journaled on said headstock;
   (d) a swing spindle housing pivotally mounted on trunnions fixed relative to said matrix support bracket, said trunnions defining a pivot axis;
   (e) a swing spindle having a tool receiving socket mounted for sliding movement within said swing spindle housing in a direction generally perpendicular to said pivot axis;
(f) a power drawbar in said swing spindle for releasably locking a toolholder therein said power drawbar being operable to pull said toolholder against said socket;
(g) pressure fluid actuator means for operating said power drawbar; and
(h) actuating means for rotating said swing spindle and its housing through 90 degrees about said pivot axis and parallel to the axis of the power driven spindle to transfer toolholders between said matrix and said exchange arm.

9. The combination set forth in claim 8 wherein said swing spindle is adapted to telescopically engage or disengage a toolholder in said matrix through axial sliding motion perpendicular to the swing spindle pivot axis, and to swing through an arc of 90 degrees to present the toolholder to said exchange arm or to return a toolholder to said matrix; and pressure fluid actuator means provides said axial sliding motion to said swing spindle.

10. The combination set forth in claim 8 which further comprises:
(a) a first pressure fluid actuator means interposed between said swing spindle housing and said swing spindle for imparting axial movement to said swing spindle in a direction perpendicular to said pivot axis
(b) a second pressure fluid actuator means for operating said power drawbar in said swing spindle; and
(c) fluid connections in said trunnions for transmitting pressure fluid to and from said first and second pressure fluid actuator means.

* * * * *